(12) United States Patent
Karri et al.

(10) Patent No.: US 11,631,433 B2
(45) Date of Patent: Apr. 18, 2023

(54) OPTIMIZED VIDEO SEGMENTATION FOR COMPLETING TASKS

(71) Applicant: International Business Machines Corporation, Armonk, NY (US)

(72) Inventors: Venkata Vara Prasad Karri, Visakhapatnam (IN); Partho Ghosh, West Bengal (IN); Gayaz Shaik, Kanigiri (IN); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/398,264

(22) Filed: Aug. 10, 2021

(65) Prior Publication Data

US 2023/0052775 A1 Feb. 16, 2023

(51) Int. Cl.
*G11B 27/031* (2006.01)
*G06V 20/40* (2022.01)

(52) U.S. Cl.
CPC ............ *G11B 27/031* (2013.01); *G06V 20/41* (2022.01); *G06V 20/49* (2022.01)

(58) Field of Classification Search
None
See application file for complete search history.

(56) References Cited

U.S. PATENT DOCUMENTS

| | | | |
|---|---|---|---|
| 9,420,213 B2* | 8/2016 | Shackleton | G06Q 10/101 |
| 9,552,842 B2* | 1/2017 | Parente | H04N 21/854 |
| 10,296,640 B1 | 5/2019 | Liao | |
| 10,939,186 B2* | 3/2021 | Gray | H04N 21/8146 |

(Continued)

FOREIGN PATENT DOCUMENTS

WO 2010095149 A1 8/2010

OTHER PUBLICATIONS

Authors et. al.: Disclosed Anonymously, "Automated Video Creation Using Audio and Video Components Extracted From Videos Based on a Received Script for the Video", An IP.com Prior Art Database Technical Disclosure, IP.com No. IPCOM000236565D, IP.com Electronic Publication Date: May 2, 2014, 52 pages.

(Continued)

*Primary Examiner* — Gelek W Topgyal
(74) *Attorney, Agent, or Firm* — Erika R. DeCosty (57) ABSTRACT

A computer-implemented method for segmenting and recombining video segments of an input video based on prerequisites is disclosed. The computer-implemented method includes classifying video segments of an input video with respective activities associated with the video segments. The computer-implemented method further includes determining one or more prerequisites for performing classified activities associated with video segments of the input video. The computer-implemented method further includes determining respective users which satisfy the one or more determined prerequisites for performing the classified activities associated with the video segments of the input video. The computer-implemented method further includes generating a new video for a user based, at least in part, on merging those video segments in which the user satisfies the one or more determined prerequisites for performing a classified activity associated with a video segment.

18 Claims, 5 Drawing Sheets

(56) References Cited

U.S. PATENT DOCUMENTS

| | | | | |
|---|---|---|---|---|
| 2008/0010601 | A1* | 1/2008 | Dachs | H04N 5/222 |
| | | | | 348/E5.022 |
| 2009/0196570 | A1* | 8/2009 | Dudas | G11B 27/034 |
| | | | | 709/206 |
| 2012/0315020 | A1* | 12/2012 | Fiumi | G06Q 10/101 |
| | | | | 705/7.14 |
| 2013/0343726 | A1* | 12/2013 | Shackleton | H04N 21/4532 |
| | | | | 386/282 |
| 2019/0228675 | A1 | 7/2019 | Geritz | |
| 2021/0006752 | A1 | 1/2021 | Garcia Kilroy | |

OTHER PUBLICATIONS

Authors et. al.: Disclosed Anonymously, "Detecting divisions in video through population behaviour", An IP.com Prior Art Database Technical Disclosure, IP.com No. IPCOM000264786D, IP.com Electronic Publication Date: Jan. 26, 2021, 3 pages.

Authors et. al.: Disclosed Anonymously, "Dynamic Manipulation of Video Content Based on Autonomous User Preference Tagging Aggregation", An IP.com Prior Art Database Technical Disclosure, IP.com No. IPCOM000262348D, IP.com Electronic Publication Date: May 21, 2020, 5 pages.

Authors et. al.: Disclosed Anonymously, "Method and System for Dynamically Assembling Video Segments from Different Videos based on Search Criteria and a Video Template", An IP.com Prior Art Database Technical Disclosure, IP.com No. IPCOM000240989D, IP.com Electronic Publication Date: Mar. 16, 2015, 4 pages.

Mell et al., "The NIST Definition of Cloud Computing", Recommendations of the National Institute of Standards and Technology, Special Publication 800-145, Sep. 2011, 7 pages.

* cited by examiner

OPTIMIZED VIDEO SEGMENTATION FOR COMPLETING TASKS

BACKGROUND

The present invention relates generally to the field of video segmentation, and more particularly to the field of video segmentation based on individual prerequisites.

Video segmentation is the process of partitioning a video sequence into disjoint sets of consecutive frames that are homogenous according to some defined criteria. Semantic video segmentation includes analyzing and classifying the concept and nature of objects, as well as recognizing them and their shape on a per frame multiple frame (scene) basis.

SUMMARY

According to one embodiment of the present invention, a computer-implemented method for segmenting and recombining video segments of an input video based on prerequisites is disclosed. The computer-implemented method includes classifying video segments of an input video with respective activities associated with the video segments. The computer-implemented method further includes determining one or more prerequisites for performing classified activities associated with video segments of the input video. The computer-implemented method further includes determining respective users which satisfy the one or more determined prerequisites for performing the classified activities associated with the video segments of the input video. The computer-implemented method further includes generating a new video for a user based, at least in part, on merging those video segments in which the user satisfies the one or more determined prerequisites for performing a classified activity associated with a video segment.

According to another embodiment of the present invention, a computer program product for segmenting and recombining video segments of an input video based on prerequisites is disclosed. The computer program product includes one or more computer readable storage media and program instructions stored on the one or more computer readable storage media. The program instructions include instructions to classify video segments of an input video with respective activities associated with the video segments. The program instructions further include instructions to determine one or more prerequisites for performing classified activities associated with video segments of the input video. The program instructions further include instructions to determine respective users which satisfy the one or more determined prerequisites for performing the classified activities associated with the video segments of the input video. The program instructions further include instructions to generate a new video for a user based, at least in part, on merging those video segments in which the user satisfies the one or more determined prerequisites for performing a classified activity associated with a video segment.

According to another embodiment of the present invention, a computer system for segmenting and recombining video segments of an input video based on prerequisites is disclosed. The computer system includes one or more computer processors, one or more computer readable storage media, and computer program instructions, the computer program instructions being stored on the one or more computer readable storage media for execution by the one or more computer processors. The program instructions include instructions to classify video segments of an input video with respective activities associated with the video segments. The program instructions further include instructions to determine one or more prerequisites for performing classified activities associated with video segments of the input video. The program instructions further include instructions to determine respective users which satisfy the one or more determined prerequisites for performing the classified activities associated with the video segments of the input video. The program instructions further include instructions to generate a new video for a user based, at least in part, on merging those video segments in which the user satisfies the one or more determined prerequisites for performing a classified activity associated with a video segment.

BRIEF DESCRIPTION OF DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

The present invention relates generally to the field of video segmentation, and more particularly to the field of video segmentation based on individual prerequisites.

Sometimes, when performing a group task, the participating users segment the activity and steps among themselves. Oftentimes, informational videos show and describe step-by-step how to complete a project or how to build an item. However, it is difficult to identify which portion of the informational video each user needs to reference and watch. Further, tasks or projects include many steps and require different skillsets, tools, or amounts of time to complete each step in order to finish the task. For example, when building a piece of furniture, there are many different steps required in order to finish building the furniture and different skills and tools are needed for the various steps.

In some instances, steps need to be done in the chronological order they are proposed (e.g., needing to complete step one before beginning step two). Typically, in these instances, the next sequential step requires a piece or a completed part from the previous step to build from or onto. In other instances, some steps may be rearranged, done out of order, independently, or parallel of each other. For example, completing step one and then completing step three before beginning or completing step two). Or, completing steps one, two, and three at the same time or in parallel. Embodiments of the present invention recognize waiting to complete one step before moving on to another step which does not depend on the previous step can result in time wasted and delays in completing a task.

Typically, steps can be designated to one or more people to complete. For example, one person can complete the first step, a second person can complete the second step, and a third person can complete the third step. In an effort to save time, these three steps can be done in parallel of one another by each person.

Different people typically have different strengths, skill sets, availabilities, and other various factors needed to complete each step. For example, one person may be familiar with power tools, while another person is not. Meaning, it would be the most beneficial to have the person familiar with power tools to complete any steps including the use of power tools. Embodiments of the present invention recognize splitting up the steps based on each person's strengths, skillsets, and other factors is highly beneficial to reduce time wasted and delays in completing a task.

Embodiments of the present invention analyze the various activities or steps in an informational video and accordingly apportion one or more video segments from the informational video into smaller, reference videos for each user. Embodiments of the present invention segment an original informational video by their respective steps or activities and re-combine the segments into shorter videos based on an individual's skill sets and strengths. Embodiments of the present invention recognize the appropriate workflow of the steps in the split videos for each user. Embodiments of the present invention further recognize at any given point of time, members of the project may be added or subtracted, and the system dynamically adjusts the split videos accordingly. Embodiments of the present invention further recognize some informational videos contain completed or reusable content and the present invention identifies such portions and removes them accordingly.

The present invention may be a system, a method, and/or a computer program product at any possible technical detail level of integration. The computer program product may include a computer readable storage medium (or media) having computer readable program instructions thereon for causing a processor to carry out aspects of the present.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suit-able combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 1:
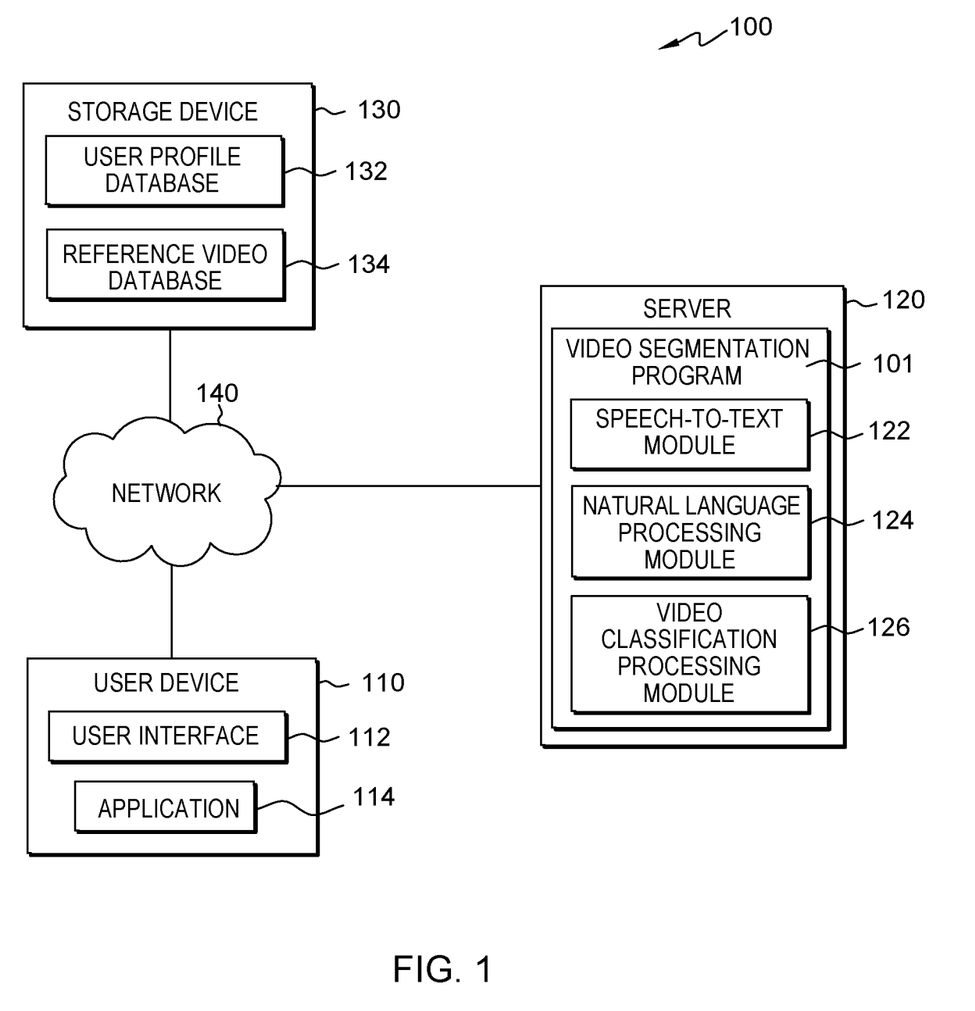
FIG. 1 is a block diagram of a network computing environment for segmenting videos and recombining video segments based on individual prerequisites, generally designated 100, in accordance with at least one embodiment of the present invention.

The present invention will now be described in detail with reference to the Figures. FIG. 1 is a functional block diagram of a network computing environment for segmenting videos and recombining video segments based on individual prerequisites, generally designated 100, in accordance with at least one embodiment of the present invention. In an embodiment, network computing environment 100 may be provided by cloud computing environment 50, as depicted and described with reference to FIG. 4, in accordance with at least one embodiment of the present invention. FIG. 1 provides an illustration of only one implementation and does not imply any limitations with regard to the environments in which different embodiments may be implemented. Many modifications to the depicted environment may be made by those skilled in the art without departing from the scope of the present invention as recited by the claims.

Network computing environment 100 includes user device 110, server 120, and storage device 130 interconnected over network 140. User device 110 may represent a computing device of a user, such as a laptop computer, a tablet computer, a netbook computer, a personal computer, a desktop computer, a personal digital assistant (PDA), a smart phone, a wearable device (e.g., smart glasses, smart watches, e-textiles, AR headsets, etc.), or any programmable computer systems known in the art. In general, user device 110 can represent any programmable electronic device or combination of programmable electronic devices capable of executing machine readable program instructions and communicating with server 120, storage device 130, and other devices (not depicted) via a network, such as network 140. User device 110 can include internal and external hardware components, as depicted and described in further detail with respect to FIG. 3.

User device 110 further includes user interface 112 and application 114. User interface 112 is a program that provides an interface between a user of an end user device, such as user device 110, and a plurality of applications that reside on the device (e.g., application 114). A user interface, such as user interface 112, refers to the information (such as graphic, text, and sound) that a program presents to a user, and the control sequences the user employs to control the program. For example, user interface 112 displays and allows for user interaction with an informational video or a user's designated video. For example, via user interface 112, a user can scrub, fast forward, rewind, or pause the video. In another example, a user can input their skill sets via user interface 112. A variety of types of user interfaces exist. In one embodiment, user interface 112 is a graphical user interface. A graphical user interface (GUI) is a type of user interface that allows users to interact with electronic devices, such as a computer keyboard and mouse, through graphical icons and visual indicators, such as secondary notation, as opposed to text-based interfaces, typed command labels, or text navigation. In computing, GUIs were introduced in reaction to the perceived steep learning curve of command-line interfaces which require commands to be typed on the keyboard. The actions in GUIs are often performed through direct manipulation of the graphical elements. In another embodiment, user interface 112 is a script or application programming interface (API).

Application 114 can be representative of one or more applications (e.g., an application suite) that operate on user device 110. In an embodiment, application 114 is representative of one or more applications (e.g., video editing applications, media applications, and media player applications) located on user device 110. In various example embodiments, application 114 can be an application that a user of user device 110 utilizes to view, segment, or otherwise edit an informational video or their respective segmented video. In an embodiment, application 114 can be a client-side application associated with a server-side application running on server 120 (e.g., a client-side application associated with video segmentation program 101). In an embodiment, application 114 can operate to perform processing steps of video segmentation program 101 (i.e., application 114 can be representative of video segmentation program 101 operating on user device 110).

Server 120 is configured to provide resources to various computing devices, such as user device 110. For example, server 120 may host various resources, such as an informational video or respective segmented and recombined portions of an informational video that are accessed and utilized by one or more user devices 110 for completion of a task or portion of a task. In various embodiments, server 120 is a computing device that can be a standalone device, a management server, a web server, an application server, a mobile device, or any other electronic device or computing system capable of receiving, sending, and processing data. In an embodiment, server 120 represents a server computing system utilizing multiple computers as a server system, such as in a cloud computing environment. In an embodiment, server 120 represents a computing system utilizing clustered computers and components (e.g. database server computer, application server computer, web server computer, webmail server computer, media server computer, etc.) that act as a single pool of seamless resources when accessed within network computing environment 100. In general, server 120 represents any programmable electronic device or combination of programmable electronic devices capable of executing machine readable program instructions and communicating with each other, as well as with user device 110, storage device 130, and other computing devices (not shown) within network computing environment 100 via a network, such as network 140.

Figure 3:
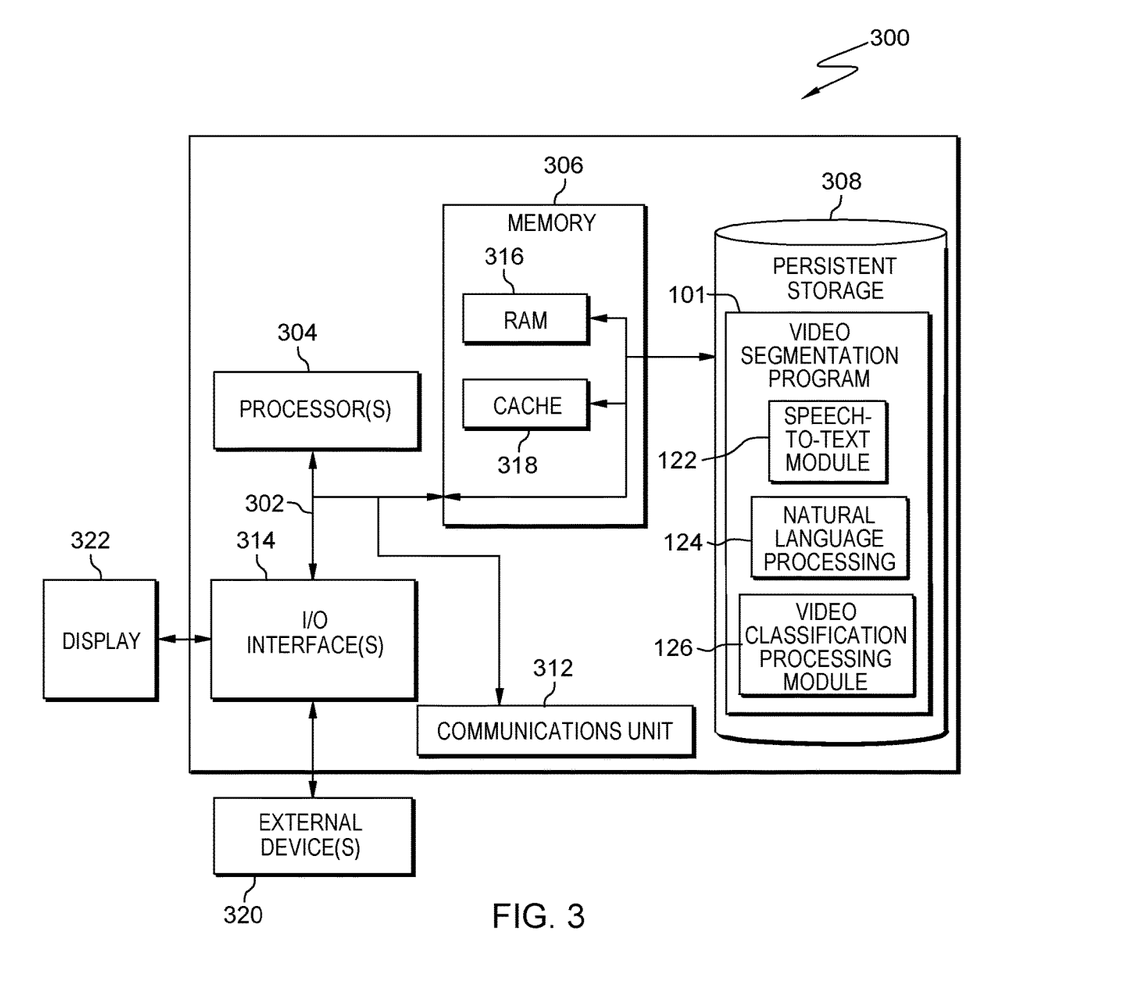
FIG. 3 is a block diagram depicting components of a computer, generally designated 300, suitable for executing a video segmentation program 101 in accordance with at least one embodiment of the present invention.
Figure 4:
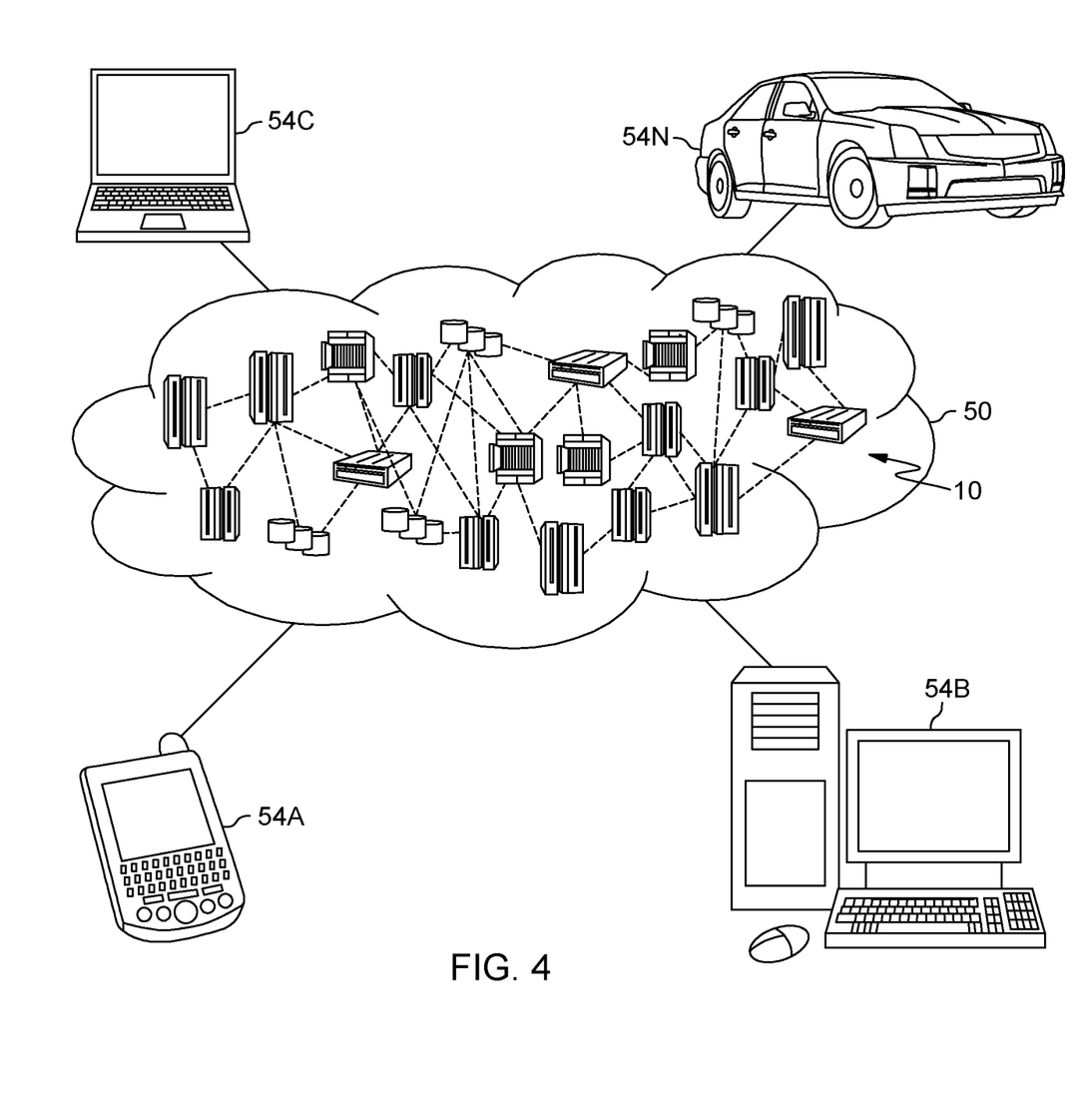
FIG. 4 is a block diagram depicting a cloud computing environment 50 in accordance with at least one embodiment of the present invention.

Server 120 may include components as depicted and described in detail with respect to cloud computing node 10, as described in reference to FIG. 4, in accordance with at least one embodiment of the present invention. Server 120 may include components, as depicted and described in detail with respect to computing device 300 of FIG. 3, in accordance with at least one embodiment of the present invention.

Server 120 includes video segmentation program 101, which further includes speech-to-text module 122, natural language processing module 124, and video classification processing module 126. In an embodiment, video segmentation program 101 is configured to access various data sources, such as the users data that may include personal data, content, contextual data, or information that a user does not want to be processed. Personal data includes personally identifying information or sensitive personal information as well as user information, such as location tracking or geolocation information. In an embodiment, video segmentation program stored and retrieves various user data (personal or otherwise) from user profile database 132. Processing refers to any operation, automated or unautomated, or set of operations such as collecting, recording, organizing, structuring, storing, adapting, altering, retrieving, consulting, using, disclosing by transmission, dissemination, or otherwise making available, combining, restricting, erasing, or destroying personal data. In an embodiment, video segmentation program 101 enables the authorized and secure processing of personal data. In an embodiment, video segmentation program 101 provides informed consent, with notice of the collection of personal data, allowing the user to opt in or opt out of processing personal data. Consent can take several forms. Opt-in consent can impose on the user to take an affirmative action before personal data is processed. Alternatively, opt-out consent can impose on the user to take an affirmative action to prevent the processing of personal data before personal data is processed. In an embodiment, video segmentation program 101 provides information regarding personal data and the nature (e.g., type, scope, purpose, duration, etc.) of the processing. In an embodiment, video segmentation program 101 provides a user with copies of stored personal data. In an embodiment, video segmentation program 101 allows for the correction or completion of incorrect or incomplete personal data. In an embodiment, video segmentation program 101 allows for the immediate deletion of personal data.

In an embodiment, speech-to-text module 122 is a component or sub-program of video segmentation program 101 that converts speech into text. For example, speech-to-text module 122 converts audio of the informational video to text in real time using one or more speech-to-text systems generally known in the art. One of ordinary skill in the art will appreciate that video segmentation program 101 can convert any verbal communication made during an informational video.

In an embodiment, the text is converted into a Unicode format (i.e., a universal encoding standard used for representing text for computer processing). In an embodiment, the text is converted into a speech synthesis mark-up language (SSML) format. In an embodiment, the raw text containing symbols (e.g., numbers and abbreviations) is converted into the equivalent of written-out words through text normalization (i.e., pre-processing or tokenization).

In an embodiment, natural language processing module 124 is a component or sub-program of video segmentation program 101 that identifies and analyzes the audio from the video and converts it into text. In an embodiment, natural language processing module 124 analyzes the text to identify a particular theme, step, activity, or topic. For example, if the informational video says "in step one make sure to use a power tool" natural language processing module 124 converts the audio to text then analyzes the text to determine that step one requires a power tool.

In an embodiment, video classification processing module 126 is a component or sub-program of video segmentation program 101 that identifies names, words, actions, and steps in the informational video. Video classification is the task of producing a label that is relevant to the video given its frames. A good video level classifier is one that not only provides accurate frame labels, but also best describes the entire video given the features and the annotations of the various frames in the video. For example, a video might contain a tree in some frame, but the label that is central to the video might be something else (e.g., "hiking"). The granularity of the labels that are needed to describe the frames and the video depends on the task. Typical tasks include assigning one or more global labels to the video, and assigning one or more labels for each frame inside the video.

In an embodiment, video classification processing module 126 determines the steps involved in the informational video and classifies segments of the video. In an embodiment, video classification processing module 126 tags each segment by what each step involves, supplies, materials, or tools required, and skills needed to complete each step.

In various embodiments, storage device 130 is a secure data repository for persistently storing informational videos, segmented videos, user videos, and user skill sets. Storage device 130 may be implemented using any volatile or non-volatile storage media known in the art for storing data. For example, storage device 130 may be implemented with a tape library, optical library, one or more independent hard disk drives, multiple hard disk drives in a redundant array of independent disks (RAID), solid-state drives (SSD), random-access memory (RAM), and any possible combination thereof. Similarly, storage device 130 may be implemented with any suitable storage architecture known in the art, such as a relational database, an object-oriented database, or one or more tables.

Storage device 130 includes user profile database 132 and reference video database 134. In an embodiment, user profile database 132 contains information on each user, such as the user's skill, educational, strength, and occupational information. In an embodiment, user profile database 132 contains information on the user's schedule and availability. For example, user profile database 132 contains a calendar of the users availability to work on tasks contributing towards a project associated with a reference video. In an embodiment, video segmentation program 101 accesses user profile database 132 to collect information on each user in order to determine how to segment and recombine various video segments for respective users based on their identified prerequisites. In an embodiment, a user uploads or provides information on their skill sets, occupation, education, and availability to user profile database 132. In an embodiment, video segmentation program 101 determines the users skill sets and other information by querying the user and identifying any information on the user on the web or their social media.

In an embodiment, reference video database 134 contains information on one or more informational videos. In an embodiment, reference video database 134 contains information on the classified and segmented informational videos. In an embodiment, the informational video is the original input video. In an embodiment, the classified and segmented informational videos are the segmented portions of the informational video classified with their designated classifications. In an embodiment, reference video database 134 contains information on the steps required in the informational videos. In an embodiment, reference video database 134 contains information on the user video. In an embodiment, the user video is a compilation of segmented portions of the informational video designated for the user. In an embodiment, video segmentation 101 accesses reference video database 134 to collect information on one or more informational videos.

For example, video segmentation program 101 receives an informational video and performs video analysis and determines and tags the objects in each image frame of the informational video. Video segmentation program 101 may determine an informational video has nine steps and segments the video into the nine different steps labeled 1-9. Video segmentation program 101 then determines each users strengths and skill sets and matches each segmented video to a user. For example, if there are three users, video segmentation program 101 may match user one with video segments 3, 6, and 7, user two with video segments 1, 4, and 9, and user three with video segments 2, 5, and 8 based on their indicated skill sets. In some instances, two users may be required for a step. In this example, video segmentation program 101 may match user one with video segments 1, 3, 6, and 7, user two with video segments 1, 4, 8 and 9, and user three with video segments 2, 5, and 8 based on their indicated skill sets. Meaning, both user one and two will work on video segment step 1 together and both user two and three will work on video segment 8 together.

In an embodiment, video segmentation program 101 segments an informational video on an activity to be performed by one or more users. In an embodiment, video segmentation program 101 determines the steps to be performed within the informational video. In an embodiment, video segmentation program 101 dynamically splits the informational video based on the individual users activities, associated prerequisites, and skills. This allows the participating users to perform and understand the activities when they collaborate with each other while using the informational video. In an embodiment, video segmentation program 101 generates one or more subsets of an initial informational video including the designated steps for each user.

In an embodiment, video segmentation program 101 receives an input video. In an embodiment, the input video is an informational video containing information and instructions to complete a large task. For example, an input video is a video describing the steps to complete a project. An input video can also include "how-to" or "do it yourself" (DIY) videos.

In an embodiment, video segmentation program 101 performs image analysis of the video frames. Image analysis is the extraction of meaningful information from digital images by means of digital image processing techniques. In an embodiment, video segmentation program 101 analyzes the video frames and determines the objects, tools, people, and steps in each video frame. In an embodiment, video segmentation program 101 tags one or more video frames with one or more tags based on the contents of the video frame.

In an embodiment, video segmentation program 101 performs audio analysis of the video frames. Audio analysis is the extraction of information and meaning from audio signals for analysis, classification, storage, retrieval, and synthesis. In an embodiment, video segmentation program 101 utilizes speech-to-text and natural language processing techniques known in the art to determine the spoken words in the informational video. In an embodiment, video segmentation program 101 tags one or more video frames with one or more tags based on the audio analysis.

In an embodiment, video segmentation program 101 identifies a correlation between the image and audio analysis and identifies one or more activities or steps which are performed with the individual objects. In an embodiment, video segmentation program 101 analyzes and identifies the image and audio analysis and classifies the activities in various dimensions. For example, the dimensions of the activities can be how any activity can be performed, types of skills required, and amount of time required to complete each activity or step.

In an embodiment, video segmentation program 101 classifies one or more sections of the informational video based on image and audio analysis. In an embodiment, video segmentation program 101 determines the timestamps of each individual step in the informational video and classifies each step. In an embodiment, video segmentation program 101 determines the context and classifications of each section of the informational video.

In an embodiment, video segmentation program 101 determines one or more of the users' skills. In an embodiment, video segmentation program 101 determines each users strengths, education level, skill sets, and occupation. For example, a user may indicate they are skilled with working with power tools, or they are a carpenter. In an embodiment, video segmentation program 101 assigns a number or ranks each users strengths. For example, a user who indicates they are a carpenter will receive a higher ranking for power tools than another user who indicates they are a chiropractor who has used power tools a few times. Meaning, video segmentation program 101 is more likely to assign a step involving power tools to the carpenter than the chiropractor. In an embodiment, video segmentation program 101 stores and accesses each users skills in user profile database 132.

In an embodiment, video segmentation program 101 determines one or more of the users' skills by requesting each user to input their skills. In an embodiment, video segmentation program 101 presents each user with a pop-up box that includes a list of skills for selection by the user. In an embodiment, video segmentation program 101 requests each user to provide various prerequisite information, including their resume, indicate their education level, or occupation. In an embodiment, video segmentation program 101 assigns a value, scale, or ranking to each user's skill. In an embodiment, video segmentation program 101 ranks each user for each skill. For example, video segmentation program 101 determines for the skillset cutting wood, user A has a skill value of 1, user B has a skill value of 0.7, and user C has a skill value of 0.5. Here, user A would be the best or most optimal to perform any steps for cutting wood identified in a video.

In an embodiment, video segmentation program 101 further determines each users availability. In an embodiment, video segmentation program 101 determines when each user can or prefers to work on the activity or project. In an embodiment, video segmentation program 101 receives the users calendar and determines the users availability from the users calendar. For example, if a first user is only available between 9 am-5 pm every day and another user is only available after 5 pm every day, video segmentation program 101 determines these two users cannot work directly together. However, video segmentation program 101 may alter the sequence of steps based on the users availability.

In an embodiment, video segmentation program 101 determines one or more prerequisites for performing a classified activity or step associated with each classified section of the input video. For example, video segmentation program 101 retrieves information from a database of prerequisites. For example, if video segmentation program 101 determines a step requires cutting wood, video segmentation program 101 will determine this step requires a user to have access to and know how to operate a saw.

In an embodiment, video segmentation program 101 compares the users skills to the classified video sections. In an embodiment, video segmentation program 101 determines one or more users which satisfy prerequisites for performing a classified activity or step associated with each classified section of the input video. In an embodiment, video segmentation program 101 determines one or more classified sections of the video which match the users skills. For example, if one step requires the use of power tools, video segmentation program 101 will find a match for this step for a user with experience with power tools. In another example, if one step takes 2 hours to complete, video segmentation program 101 determines a match with users who have availability in their schedule to work on the step for 2 hours. Meaning if one user has only 1 hour increments of availability, this user will not be considered a match for this step.

In an embodiment, video segmentation program 101 determines a match with the users skill based on the rank, weight, or score given to each users skill. In an embodiment, video segmentation program 101 selects the user with the highest rank, weight, or score for each video segmentation step skillset. For example, if video segmentation 3 requires skillset of wood cutting and for skillset woodcutting user A is given a score of 0.8, user B is 0.6, and user C is 0.9, user C will be selected for video segmentation 3 since their woodcutting skill is ranked the highest.

In an embodiment, video segmentation program 101 segments each classified section of video based on a determined classification. In an embodiment, video segmentation program 101 splits the informational video up into one or more segments based on the classification of the segment. In an embodiment, video segmentation program 101 segments each classified section by a determined step, activity, or topic associated with a video segment. In an embodiment, video segmentation program 101 recombines one or more segments based on matching user skills to the classifications of the one or more video segments. In an embodiment, video segmentation program merges the classified sections to create one or more new videos In an embodiment, video segmentation program 101 identifies and assigns activities or steps to each user to perform the activities or steps. In an embodiment with multiple users, video segmentation program 101 recombines one or more segments and creates a new video for each user. In this embodiment, each user can individually perform the activity and finally can merge the activity and steps. In an embodiment, video segmentation program 101 dynamically rearranges or reorders the video segments.

In an embodiment, video segmentation program 101 dynamically alters the recombined segments based on the workflow. In an embodiment, video segmentation program 101 identifies the appropriate workflow from the original video and determines the order of steps or workflow for the new videos for each user. For example, if it is determined step three can be performed before step one, and step three is assigned to user A and step one is assigned to user B, video segmentation program 101 determines it allowable that user A can complete step three before user B completes step one, and dynamically alters each users segmented video to reflect. However, if it is determined the steps must be completed in chronological order, video segmentation program 101 dynamically alters each users segmented video to reflect this appropriate workflow. In an embodiment, the workflow is based on the user's availability and the addition or loss of a user to the activity. In an embodiment, if one or more team members are joined and share the activities, or one or more team members are moved out or added, video segmentation program 101 dynamically alters the videos.

For example, if one or more users join or share activities, or if one or more users leave the activity, video segmentation program 101 dynamically alters which segmented videos are merged together. For example, if for an informational video segmented into 6 steps with 2 initial users, the first user is assigned steps 1, 3, and 5 and merges video segmentation program 101 segments with steps 1, 3, and 5 for the first user. Here, the second user is assigned steps 2, 4, and 6 and video segmentation program 101 merges segments with steps 2, 4, and 6 for the first user. If a third user joins, video segmentation program 101 dynamically adjusts the merged segments to include steps 1 and 5 for the first user, steps 2 and 4 for the second user, and steps 3 and 6 for the third user.

In an embodiment, if a one or more users leaves or becomes unavailable for their assigned activity or step, video segmentation program 101 dynamically alters which segmented videos are merged together. For example, if user A was designated step 3, and user A is now unavailable, video segmentation program 101 determines the next highest ranked user with matching skill sets for step 3 to replace user A. For example, for the skillset if user A was ranked 0.8, user B was ranked 0.3, and user C was ranked 0.6, video segmentation program 101 dynamically alters which segmented videos are merged together to include step 3 for user C.

In an embodiment, video segmentation program 101 determines any already completed or reusable content or steps and removes such segments. In an embodiment, if video segmentation program 101 identifies a step has already been completed, video segmentation program 101 removes the identified step and its respective segment from future merged videos. For example, if for an informational video segmented into 6 steps with 2 initial users, the first user is assigned steps 1, 3, and 5 and merges video segmentation program 101 segments with steps 1, 3, and 5 for the first user. Here, the second user is assigned steps 2, 4, and 6 and video segmentation program 101 merges segments with steps 2, 4, and 6 for the first user. If steps 2 and 6 are already completed when a third user joins, video segmentation program 101 dynamically adjusts the merged segments to include steps 1 and 5 for the first user, steps 4 for the second user, and step 3 for the third user.

In an embodiment, video segmentation program 101 is designed for a single user. In these embodiments, video segmentation program 101 determines the users availability and tools and materials availability. For example, a user may only have access to the required power tools during a certain time period. Further, the user may have three free hours to work on the project on Monday but only one free hour on Tuesday. Meaning, larger or longer steps will be designated when the user has more free time, such as on Monday, if the sequential requirement of steps allow. In these embodiments, video segmentation program 101 generates one or more videos for the single user based on the users availability and tools and materials availability.

Figure 2:
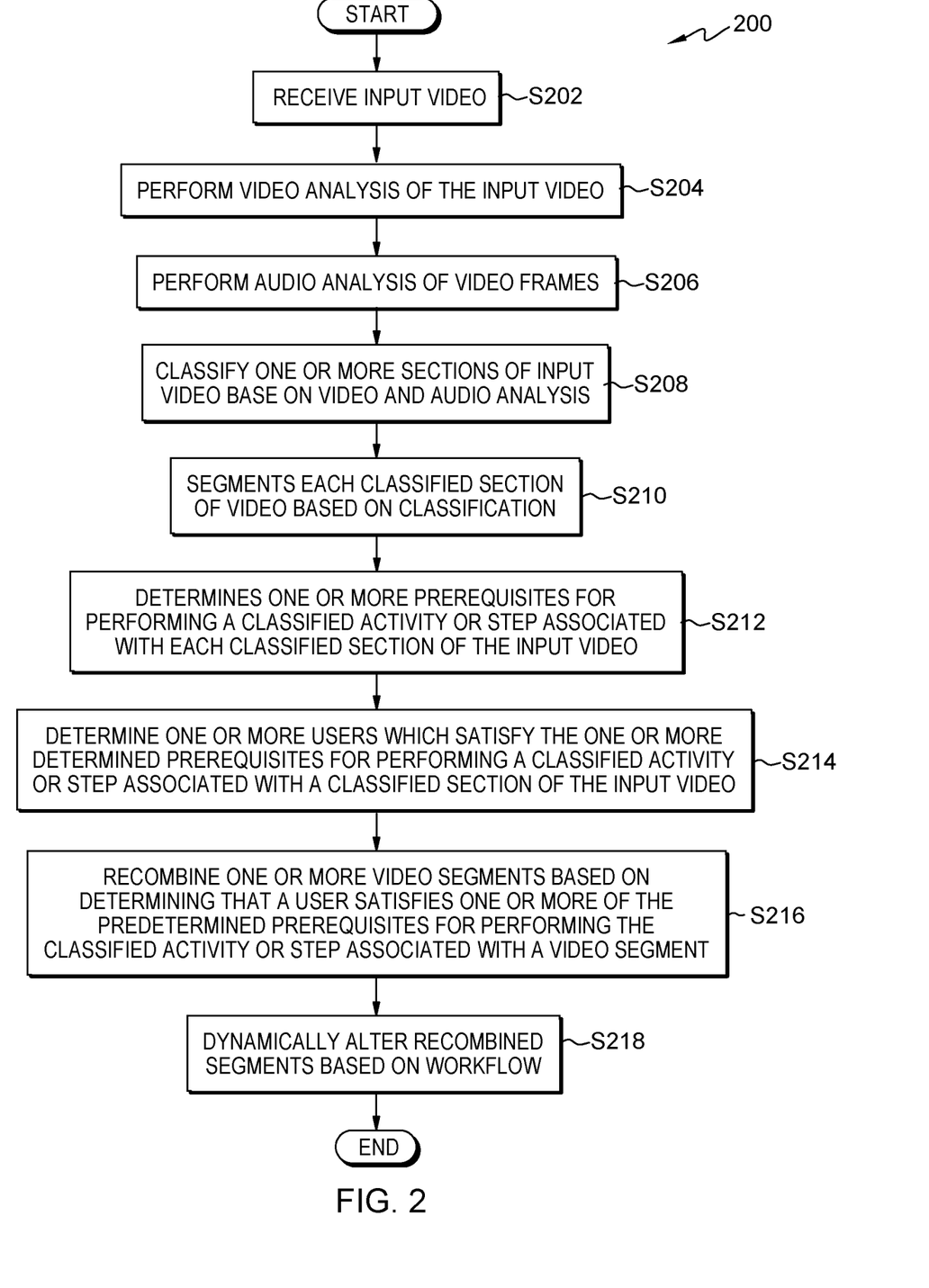
FIG. 2 is a flow chart diagram depicting operational steps for segmenting videos and recombining video segments based on individual prerequisites, generally designated 200, in accordance with at least one embodiment of the present invention.

FIG. 2 is a flow chart diagram depicting operational steps for generating a segmented video, generally designated 200, in accordance with at least one embodiment of the present invention. FIG. 2 provides only an illustration of one implementation and does not imply any limitations with regard to the environments in which different embodiments may be implemented. Many modifications to the depicted environment may be made by those skilled in the art without departing from the scope of the invention as recited by the claims.

At step S202, video segmentation program 101 receives an input video. In an embodiment, the input video is an informational video containing information and instructions to complete a large task.

At step S204, video segmentation program 101 performs video analysis of the input video. In an embodiment, video segmentation program 101 performs video analysis on a frame by frame basis. In an embodiment, video segmentation program 101 analyzes the video frames and determines the objects, tools, people, step, context, topic, theme, and activity corresponding to each video frame or sequence of video frames. In an embodiment, video segmentation program 101 tags one or more video frames with one or more tags based on the contents, topic, theme, or activity of a video frame or sequence of video frames determined from the video analysis.

At step S206, video segmentation program 101 performs audio analysis of video frames. In an embodiment, video segmentation program converts audio of the video into text and analyzes the text. In an embodiment, video segmentation program performs audio analysis on a frame by frame basis. In an embodiment, video segmentation program 101 analyzes the audio from the video and determines the objects, tools, people, step, topic, theme, and activity corresponding to each video frame or sequence of video frames. In an embodiment, video segmentation program 101 tags one or more video frames with one or more tags based on the content, context, topic, theme, or activity of a video frame or sequence of video frames determined from the audio analysis.

At step S208, video segmentation program 101 classifies one or more sections of the input video based on the video and audio analysis. In an embodiment, video segmentation program 101 classifies a section of the input video based on comparing a context of the video to one or more known classifications associated with the context. In an embodiment, video segmentation program 101 classifies particular activities or steps to be performed in the input video based on the video and audio analysis.

At step S210, video segmentation program 101 segments each classified section of video based on the classification. In an embodiment, video segmentation program 101 segments each classified section by a different activity or step to be performed in the input video.

At step S212, video segmentation program 101 determines one or more prerequisites for performing a classified activity or step associated with each classified section of the input video. In an embodiment, video segmentation program 101 determines one or more prerequisites by analyzing the text determined from performing speech to text analysis.

At step S214, video segmentation program 101 determines one or more users which satisfy the one or more determined prerequisites for performing a classified activity or step associated with a classified section of the input video. In an embodiment, video segmentation program 101 determines each users strengths, skill level, occupation, education level, and availability. In an embodiment, video segmentation program 101 matches and assigns steps to users based on their skills matching a classified section of the video. In an embodiment, video segmentation program 101 assigns a value, scale, or ranking to each user's skill. In an embodiment, video segmentation program 101 selects the user with the highest value, scale, or ranking for performing a classified activity or step. For example, if it is determined a classified section of video is for using a nail gun, video segmentation program 101 matches this classified section of the video with a user with experience with a nail gun.

At step S216, video segmentation program 101 recombines one or more video segments based on determining that a user satisfies of the one or more predetermined prerequisites for performing the classified activity or step associated with a video segment. In an embodiment, video segmentation program 101 merges one or more video segments to create a new video for each user containing information on their assigned steps.

At step S218, video segmentation program 101 dynamically alters recombined segments based on workflow. In an embodiment, video segmentation program 101 identifies the appropriate workflow from the original video and determines the order of steps or workflow for the new videos for each user. In an embodiment, if one or more team members are joined and share the activities, or one or more team members are moved out or added, video segmentation program 101 dynamically alters the videos.

FIG. 3 is a block diagram depicting components of a computing device, generally designated 300, suitable for video segmentation program 101 in accordance with at least one embodiment of the invention. Computing device 300 includes one or more processor(s) 304 (including one or more computer processors), communications fabric 302, memory 306 including, RAM 316 and cache 318, persistent storage 308, which further includes video segmentation program 101, communications unit 312, I/O interface(s) 314, display 322, and external device(s) 320. It should be appreciated that FIG. 3 provides only an illustration of one embodiment and does not imply any limitations with regard to the environments in which different embodiments may be implemented. Many modifications to the depicted environment may be made.

As depicted, computing device 300 operates over communications fabric 302, which provides communications between computer processor(s) 304, memory 306, persistent storage 308, communications unit 312, and input/output (I/O) interface(s) 314. Communications fabric 302 can be implemented with any architecture suitable for passing data or control information between processor(s) 304 (e.g., microprocessors, communications processors, and network processors), memory 306, external device(s) 320, and any other hardware components within a system. For example, communications fabric 302 can be implemented with one or more buses.

Memory 306 and persistent storage 308 are computer readable storage media. In the depicted embodiment, memory 306 includes random-access memory (RAM) 316 and cache 318. In general, memory 306 can include any suitable volatile or non-volatile one or more computer readable storage media.

Program instructions for video segmentation program 101 can be stored in persistent storage 308, or more generally, any computer readable storage media, for execution by one or more of the respective computer processor(s) 304 via one or more memories of memory 306. Persistent storage 308 can be a magnetic hard disk drive, a solid-state disk drive, a semiconductor storage device, read-only memory (ROM), electronically erasable programmable read-only memory (EEPROM), flash memory, or any other computer readable storage media that is capable of storing program instructions or digital information.

Media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 312, in these examples, provides for communications with other data processing systems or devices. In these examples, communications unit 312 can include one or more network interface cards. Communications unit 312 may provide communications through the use of either or both physical and wireless communications links. In the context of some embodiments of the present invention, the source of the various input data may be physically remote to computing device 300 such that the input data may be received, and the output similarly transmitted via communications unit 312.

I/O interface(s) 314 allows for input and output of data with other devices that may operate in conjunction with computing device 300. For example, I/O interface(s) 314 may provide a connection to external device(s) 320, which may be as a keyboard, keypad, a touch screen, or other suitable input devices. External device(s) 320 can also include portable computer readable storage media, for example thumb drives, portable optical or magnetic disks, and memory cards. Software and data used to practice embodiments of the present invention can be stored on such portable computer readable storage media and may be loaded onto persistent storage 308 via I/O interface(s) 314. I/O interface(s) 314 also can similarly connect to display 322. Display 322 provides a mechanism to display data to a user and may be, for example, a computer monitor.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

FIG. 4 is a block diagram depicting a cloud computing environment 50 in accordance with at least one embodiment of the present invention. Cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
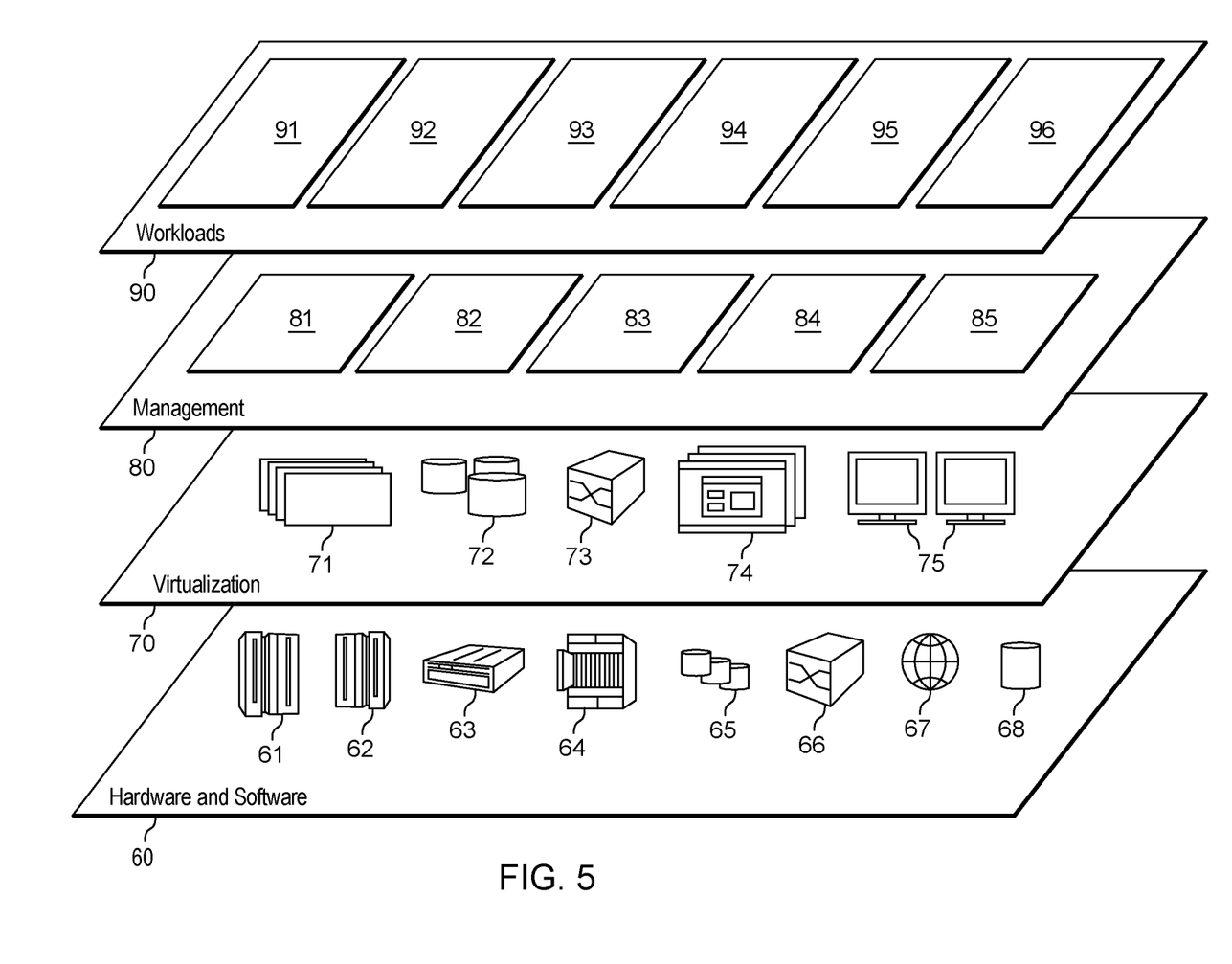
FIG. 5 is block diagram depicting a set of functional abstraction model layers provided by cloud computing environment 50 depicted in FIG. 4 in accordance with at least one embodiment of the present invention.

FIG. 5 is block diagram depicting a set of functional abstraction model layers provided by cloud computing environment 50 depicted in FIG. 3 in accordance with at least one embodiment of the present invention. It should be understood in advance that the components, layers, and functions shown in FIG. 4 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and video segmentation and recombination 96.

What is claimed is:

1. A computer-implemented method for segmenting and recombining video segments of an input video based on prerequisites, the computer-implemented method comprising:

classifying video segments of an input video with respective activities associated with the video segments;

determining one or more prerequisites for performing classified activities associated with video segments of the input video;

determining respective users which satisfy the one or more determined prerequisites for performing the classified activities associated with the video segments of the input video;

identifying a classified activity associated with one or more video segments of the input video that were previously completed;

removing one or more video segments of the input video that are associated with a similar classified activity as the classified activity and have yet to be completed; and generating a new video for a user based, at least in part, on merging those uncompleted video segments of the input video associated with the classified activity in which the user satisfies the one or more determined prerequisites for performing the classified activity.

2. The computer-implemented method of claim 1, comprising:

dynamically altering the merged video segments of the new video based on a workflow.

3. The computer-implemented method of claim 2, wherein the workflow is determined based at least in part on an order in which certain classified activities associated with one or more video segments need to be performed.

4. The computer-implemented method of claim 2, wherein the workflow is determined based at least in part on a user's availability to perform a classified activity associated with a video segment.

5. The computer-implemented method of claim 1, wherein determining respective users which satisfy the one or more determined prerequisites for performing the classified activities associated with the video segments of the input video, is further based, at least in part, on:
   determining one or more skillsets of a plurality of users; and
   comparing the one or more skillsets of the plurality of users to the one or more determined prerequisites for performing the classified activities associated with the video segments.

6. The computer-implemented method of claim 5, wherein determining respective users which satisfy the one or more determined prerequisites for performing the classified activities associated with the video segments of the input video further comprises:
   ranking the one or more users skillsets; and
   selecting a user with the highest ranking as satisfying the one or more determined prerequisites for performing a classified activity associated with a video segment of the input video.

7. A computer program product for segmenting and recombining video segments of an input video based on prerequisites, the program instructions including instructions to:
   classify video segments of an input video with respective activities associated with the video segments;
   determine one or more prerequisites for performing classified activities associated with video segments of the input video;
   determine respective users which satisfy the one or more determined prerequisites for performing the classified activities associated with the video segments of the input video;
   identifying a classified activity associated with one or more video segments of the input video that were previously completed;
   removing one or more video segments of the input video that are associated with a similar classified activity as the classified activity and have yet to be completed; and
   generating a new video for a user based, at least in part, on merging those uncompleted video segments of the input video associated with the classified activity in which the user satisfies the one or more determined prerequisites for performing the classified activity.

8. The computer program product of claim 7, further comprising instructions to:
   dynamically alter the merged video segments of the new video based on a workflow.

9. The computer program product of claim 8, wherein the workflow is determined based at least in part on an order in which certain classified activities associated with one or more video segments need to be performed.

10. The computer program product of claim 8, wherein the workflow is determined based at least in part on a user's availability to perform a classified activity associated with a video segment.

11. The computer program product of claim 7, wherein determining respective users which satisfy the one or more determined prerequisites for performing the classified activities associated with the video segments of the input video, is further based, at least in part, on:
   determining one or more skillsets of a plurality of users; and
   comparing the one or more skillsets of the plurality of users to the one or more determined prerequisites for performing the classified activities associated with the video segments.

12. The computer program product of claim 11, wherein determining respective users which satisfy the one or more determined prerequisites for performing the classified activities associated with the video segments of the input video further comprises:
   ranking the one or more users skillsets; and
   selecting a user with the highest ranking as satisfying the one or more determined prerequisites for performing a classified activity associated with a video segment of the input video.

13. A computer system for segmenting and recombining video segments of an input video based on prerequisites, comprising:
   one or more computer processors;
   one or more computer readable storage media; and
   computer program instructions, the computer program instructions being stored on the one or more computer readable storage media for execution by the one or more computer processors, the computer program instructions including instructions to:
      classify video segments of an input video with respective activities associated with the video segments;
      determine one or more prerequisites for performing classified activities associated with video segments of the input video;
      determine respective users which satisfy the one or more determined prerequisites for performing the classified activities associated with the video segments of the input video;
      identifying a classified activity associated with one or more video segments of the input video that were previously completed;
      removing one or more video segments of the input video that are associated with a similar classified activity as the classified activity and have yet to be completed; and
      generating a new video for a user based, at least in part, on merging those uncompleted video segments of the input video associated with the classified activity in which the user satisfies the one or more determined prerequisites for performing the classified activity.

14. The computer system of claim 13, further comprising instructions to:
   dynamically alter the merged video segments of the new video based on a workflow.

15. The computer system of claim 14, wherein the workflow is determined based at least in part on an order in which certain classified activities associated with one or more video segments need to be performed.

16. The computer system of claim 14, wherein the workflow is determined based at least in part on a user's availability to perform a classified activity associated with a video segment.

17. The computer system of claim 13, wherein determining respective users which satisfy the one or more determined prerequisites for performing the classified activities associated with the video segments of the input video, is further based, at least in part, on:

determining one or more skillsets of a plurality of users; and compairing the one or more skillsets of the plurality of users to the one or more determined prerequisites for performing the classified activities associated with the video segments.

18. The computer system of claim 17, wherein determining respective users which satisfy the one or more determined prerequisites for performing the classified activities associated with the video segments of the input video further comprises:

ranking the one or more users skillsets; and selecting a user with the highest ranking as satisfying the one or more determined prerequisites for performing a classified activity associated with a video segment of the input video.

* * * * *